United States Patent [19]

Magura et al.

[11] 4,245,884
[45] Jan. 20, 1981

[54] OPTICAL COUPLER FOR INTERCONNECTING TWO OR MORE OPTICAL TRANSMISSION LINES

[75] Inventors: Paul Magura, Boca Raton; Gerald U. Merckel, Delray Beach, both of Fla.

[73] Assignee: International Business Machines Corporation, Armonk, N.Y.

[21] Appl. No.: 972,403

[22] Filed: Dec. 22, 1978

[51] Int. Cl.³ .............................................. G02B 5/14
[52] U.S. Cl. ..................... 350/96.16; 350/96.15; 350/96.18
[58] Field of Search ................ 350/96.18, 96.15, 96.16

[56] References Cited

U.S. PATENT DOCUMENTS

| | | | |
|---|---|---|---|
| 3,018,362 | 1/1962 | Joyce | 362/32 |
| 3,455,625 | 7/1969 | Brumley et al. | 350/96.22 |
| 3,883,222 | 5/1975 | Gunderson | 350/96.16 |
| 4,011,005 | 3/1977 | Hawkes et al. | 350/96.16 |
| 4,119,362 | 10/1978 | Holzman | 350/96.18 |
| 4,139,259 | 2/1979 | Kersten et al. | 350/96.16 |

FOREIGN PATENT DOCUMENTS 2703887 8/1977 Fed. Rep. of Germany ........ 350/96.18

*Primary Examiner*—Stewart J. Levy
*Attorney, Agent, or Firm*—Richards, Harris & Medlock

[57] ABSTRACT

An optical coupler includes a transparent sphere having a reflective coating on the surface thereof for reflecting light within the sphere. A light source optical transmission line introduces light into the sphere which radiates directly to output optical transmission lines. The light introduced into the sphere is also reflected one or more times and is then introduced into one of the transmission lines.

10 Claims, 3 Drawing Figures

OPTICAL COUPLER FOR INTERCONNECTING TWO OR MORE OPTICAL TRANSMISSION LINES

DESCRIPTION

1. Technical Field

The present invention relates to optical couplers, and particularly relates to optical couplers for optically connecting two or more optical transmission lines.

2. Background Art

With the development of efficient optical fibers for transmission of light, it is often desirable to use light as a carrier of data or information. However, in the implementation of such optical communication systems, efficient optical couplers are required to maintain reasonable costs and to achieve an acceptable overall light transfer efficiency. In many optical communication systems using optical fibers, it is necessary to use the information carried by a single fiber at more than one location. Thus, it is necessary to split the light within the single fiber into two or more fibers. This result is normally achieved using optical couplers. A T coupler is used to split the light signal into two or more fibers, and a "star" coupler is used to split the light signal into three or more fibers. A combination of T and star couplers, known as a hybrid coupler, has also been used to perform this desired function.

An optical fiber typically includes a core surrounded by a cladding material. The light travels through the core with the interface between the core and the cladding functioning as a reflector. In one type of T coupler, a core within the coupler splits forming a Y with each fork of the Y receiving about half of the light from the input of the coupler. The forks of the Y form the outputs of the coupler.

In another type of T coupler, three elongated frustroconical shaped arms are joined at their smaller ends to form a Y with the surfaces of the arms being reflective to light impinging thereon from within the arms. The dimensions and taper of the arms are critical and are matched with optical transmission lines according to the diameter of such lines.

In another type of conventional multiple port coupler, internal fibers run from each port of the coupler to each other coupler port. Light input into any port is transmitted by the internal fibers and may be detected at all of the remaining ports. Such coupler construction is generally complicated, intricate and expensive.

In yet another type of optical coupler, a plurality of optical transmission lines are abutted against one end of a diffusion rod, and a mirror is placed on the opposite end of the rod. Light is transmitted into the diffusion rod by one transmission line. The light travels through the diffusion rod and is reflected back towards the remaining optical transmission lines by the mirror. The efficiency of this coupler is primarily limited by the light absorption and dispersion characteristics of the diffusion rod and the reflecting efficiency of the mirror.

Although known optical couplers have performed optical coupling adequately for many applications, conventional optical couplers are often expensive, difficult to use or inefficient. Therefore, there exists a need for an efficient optical coupler that is inexpensive to manufacture and easy to use. The present invention is an optical coupler fulfulling these needs.

SUMMARY OF INVENTION

In accordance with the invention, a plural port optical coupler interconnects two or more optical transmission lines in an optical communication system. The coupler includes a reflective spherical surface defining a spherical volume. The interior of the spherical volume is transparent to light, and the reflective spherical surface is operable to reflect light impinging thereon from within the spherical volume. The optical transmission lines are optically coupled through the reflective spherical surface for optically communicating with the interior of the spherical volume. Light transmitted from one of the optical transmission lines travels through the spherical volume and into another of the optical transmission lines. Light within the spherical volume is reflected by the spherical surface into at least one of the optical transmission lines. In this manner, the transmission lines are optically coupled.

In accordance with a particular embodiment of the present invention, a plural port optical coupler includes a solid transparent sphere with a reflective coating deposited on the surface of the sphere for reflecting light impinging on the coating from within the sphere. An input window is formed in the coating and dimensioned to receive the end of a light source optical transmission line for inputting light into the sphere. An input cavity is formed in the sphere adjacent the input window and is filled with index fluid of a selected index of refraction to maximize light transfer into the sphere.

A first output window is formed in the reflective coating on the opposite side of the sphere relative to the input window and is dimensioned to receive the end of a first output transmission line for introducing light from within the sphere into the first output transmission line. A first output cavity is formed in the sphere adjacent the first output window and is filled with index fluid of a selected index of refraction to maximize light transfer into the first output transmission line. Second and third output windows are shown at additional spherical surface locations. The second and third output windows are dimensioned to receive the end of the second and third transmission lines, respectively, for introducing light from within the sphere into the second and third transmission lines. Second and third output cavities are formed in the sphere adjacent to the second and third output windows, respectively, and are filled with index fluid having a selected index of refraction to maximize light transfer to the second and third output transmission lines.

A housing encloses the sphere, and passageways are formed in the housing for receiving the optical transmission lines. Also, the passageways are tapered to allow easy insertion of the transmission lines into the passageway. The narrow end of the tapered passageway applies a slight radial force to the optical transmission lines that positions the transmission lines in proper alignment with the input and output windows in the reflective coating on the sphere.

BRIEF DESCRIPTION OF THE DRAWINGS

The invention may best be understood by those of ordinary skill in the art by reference to the following Detailed Description when considered in conjunction with the accompanying Drawings in which.

DETAILED DESCRIPTION

Figure 1:
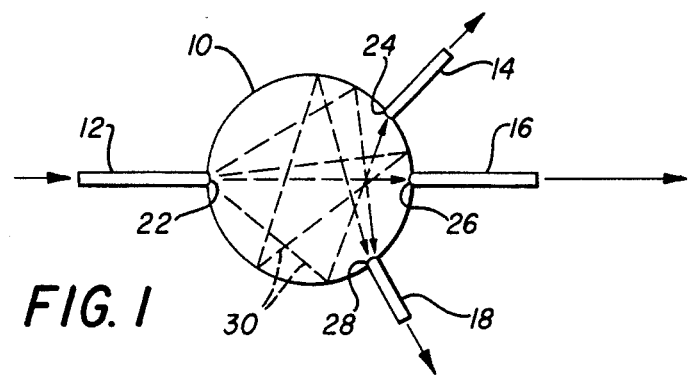
FIG. 1 is a perspective view of a spherical optical coupler embodying the present invention.

Referring now to the drawings in which like reference characters designate like or corresponding parts throughout the several views, there is shown in FIG. 1 a sphere 10 functioning as an optical coupler and embodying the present invention. The sphere 10 is a solid transparent spherical body with a reflective surface coating such as a vacuum deposited reflective metallic coating. The sphere 10 itself may be constructed of optical glass or plastic. The material chosen for the construction of the sphere 10 should have excellent transparency properties for the particular frequency light that is being used. Likewise, the reflective coating on the sphere 10 should be chosen to optimize reflection efficiency for light impinging on the coating from within the sphere. The reflective material that is deposited on the sphere 10 should be selected to provide maximum reflectivity at operating light wave lengths. Aluminum and magnesium fluoride are examples of materials that may be used as a reflective coating on the sphere 10. Also, it is envisioned that an appropriate refractive material may also be used as a coating on the sphere 10 to provide the required reflective property. To achieve efficient reflection, the surface of the sphere should be formed with small surface irregularities. Ideally, the surface of the sphere should have irregularities smaller than approximately 100 angstroms.

A light source optical transmission line 12 introduces light into the sphere 10, and output optical transmission lines 14, 16 and 18 receive light from within the sphere. The light source optical transmission line 12 and the output optical transmission lines 14, 16 and 18 extend radially from the sphere 10 to maximize transfer efficiencies. The light introduced into the sphere 10 by the transmission line 12 is radiated directly to each of the optical transmission lines 14, 16 and 18, and also the light within the sphere 10 is reflected one or more times by the reflective coating on the surface of the sphere. Eventually, light is reflected into one of the output transmission lines 14, 16 or 18. For enhancing transfer efficiencies and minimization of dispersion effects, the diameter of the sphere 10 should be on the order of the radius of the optical transmission line 12, for example, up to four to six times the diameter of the transmission line 12.

An input optical window 22 is formed in the reflective coating on the sphere 10 and is dimensioned to receive the light source optical transmission line 12. Likewise, output optical windows 24, 26 and 28 are formed in the reflective coating the sphere 10 for receiving the output optical transmission lines 14, 16 and 18, respectively. As will hereinafter be described in greater detail, the optical windows are constructed to provide efficient light transfer between the sphere and the optical transmission lines 12, 14, 16 and 18. Because of limitations of a two dimensional drawing, the impression is given that the transmission lines 12, 14, 16 and 18 are in the same plane, it should be understood, however, that the input and output lines may be located at many points on the surface of the sphere 10.

The transmission lines 12, 14, 16 and 18 are mechanically secured adjacent the optical windows 22, 24, 26 and 28 in an appropriate manner. For example, a housing or chassis may be used to mount the sphere 10 and the transmission lines 12, 14, 16 and 18 in an abutting relationship.

The dotted lines 30 within the sphere 10 represent possible light ray paths through the sphere. The light paths illustrated by dotted lines 30 are exemplary only, and it will be appreciated that an infinite number of light paths exists for the transmission of light between the light source optical transmission line 12 and the output optical transmission lines 14, 16 and 18.

The optical window 22 may be configured in a geometry for transmitting light within the sphere 10 in a predetermined light pattern. This light pattern should be chosen to optimize the amount of light transferred to the output transmission lines 14, 16 and 18. The precise light pattern chosen would vary depending on the location of the optical windows 24, 26 and 28. Also, the optical windows 24, 26 and 28 should be constructed having a geometry for maximizing the amount of light accepted by the optical transmission lines 14, 16 and 18. Thus, the windows 24, 26 and 28 should tend to collimate light impinging on these windows to facilitate acceptance of the light into the optical transmission lines 14, 16 and 18.

Figure 2:
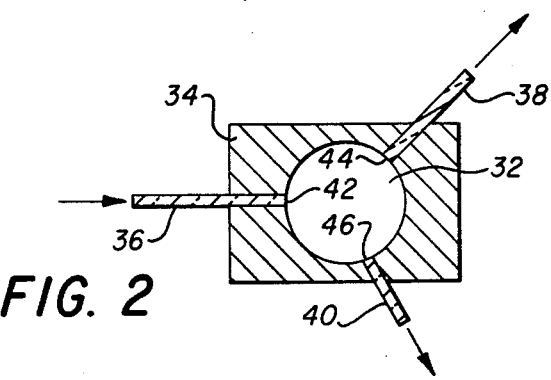
FIG. 2 is a somewhat diagrammatical cross sectional view of an alternate embodiment of the invention showing a spherical cavity formed within a solid block.

Referring now to FIG. 2, there is shown a cross sectional view of an alternate embodiment of the present invention in which a spherical cavity 32 is formed in a solid block 34. A light source optical transmission line 36 is connected for introducing light into the spherical cavity 32, and output optical transmission lines 38 and 40 are connected to receive light from the spherical cavity. The interior surface of the spherical cavity 32 is a reflective material for efficiently reflecting light within the spherical cavity.

Optical windows 42, 44 and 46 are provided in the interior surface of the spherical cavity 32 for allowing light to pass into and out of the spherical cavity. These optical windows may simply be apertures formed in the solid block 34 and the surface of the spherical cavity 32, or the windows 42, 44 and 46 may include one or more lenses for optimizing the transfer of light between the light source optical transmission line 36 and the output optical transmission lines 38 and 40.

The optical coupler shown in FIG. 2 functions in a manner similar to the optical coupler shown in FIG. 1. Light is introduced into the cavity 32 by the light source optical transmission line 36. Light within the cavity 32 is transmitted directly to the output transmission lines 38 and 40, and the light is also reflected one or more times by the reflective interior spherical surface of the cavity 32 until the light is reflected into the optical transmission lines.

Figure 3:
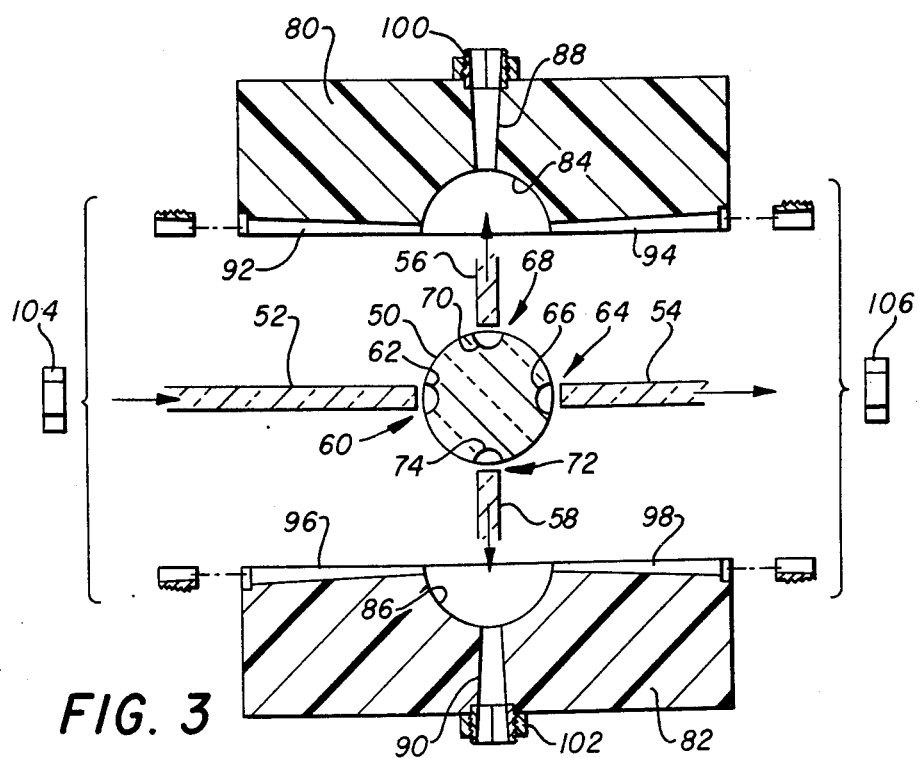
FIG. 3 is a cross sectional exploded view showing a spherical optical coupler and a housing for containing the coupler.

Referring now to FIG. 3, there is shown an exploded view of another embodiment of the present invention. A solid transparent sphere 50 having a reflective coating on its exterior surface is constructed in a manner similar to the sphere 10 shown in FIG. 1. A light source optical transmission line 52 inputs light into the sphere 50, and the light within the sphere is output through a primary output optical transmission line 54 and secondary output optical transmission lines 56 and 58. The optical transmission lines 52, 54, 56 and 58 are shown slightly detached from the sphere 50 for purposes of illustration only. When fully constructed, the optical transmission lines are abutting or attached to the sphere 50.

An optical window 60 is formed in the reflective surface of the sphere 50 for receiving the transmission line 52. The window 60 includes a cavity 62 formed in the sphere 50 for being filled with transparent oil or other fluid having a predetermined index of refraction, hereinafter termed "index fluid." The geometry of the end of the transmission line 52 and the geometry of the cavity 62 in combination with the index fluid form a lens for directing light in a predetermined pattern within the sphere 50. Thus, the desired light pattern within the sphere 50 may be achieved by appropriately modifying the geometry of the cavity 62 and the end of the transmission line 52 and by selecting an index fluid having an appropriate index of refraction. The purpose of the index fluid is to maximize light transfer efficiency. The index fluid may be eliminated, but light transfer efficiencies may decrease.

In like manner, optical windows 64, 68 and 72 are formed in the surface of the spheres 50 for receiving the optical transmission line 54, 56 and 58, respectively. The optical windows 64, 68 and 72 include cavities 66, 70 and 74, respectively, formed in the sphere 50 for being filled with an appropriate index fluid. Again, the geometries of the ends of the output transmission lines in combination with the geometry of the cavities and the index fluid in the cavities form lenses. Such lenses should be designed to optimize the amount of light that is accepted into the output transmission lines 54, 56 and 58.

The primary output transmission line 54 is positioned on the opposite side of the sphere 50 from the light source transmission line 52. In the preferred embodiment, the lens formed in part by the cavity 62 is chosen to create a light pattern for inputting more light into the primary output transmission line 54 than into the secondary output transmission lines 56 and 58.

The secondary output transmission lines 56 and 58 are positioned on opposite sides of the sphere 50 and are disposed equidistantly from the optical window 60 through which light is introduced into the sphere 50. The lens formed in part by the cavity 62 is chosen so that an equal amount of light is introduced into the secondary transmission lines 56 and 58. By appropriately choosing the geometry of the cavity 62 and by appropriately locating the output transmission lines 54, 56 and 58, a desired light distribution between the output transmission lines may be achieved.

Housing blocks 80 and 82 are provided for containing the sphere 50 and the optical transmission lines 52, 54, 56 and 58. Hemispherical cavities 84 and 86 are formed in the housing blocks 80 and 82, respectively. When the housing blocks are abutted together, the hemispherical cavities 84 and 86 form a spherical cavity snuggly containing the sphere 50. Passageways 88 and 90 are formed in the housing, blocks 80 and 82, respectively, for allowing the optical transmission lines 56 and 58 to pass therethrough. Hemicylindrical cavities 92 and 94 are formed in the housing block 80, and mating hemicylindrical cavities 96 and 98 are formed in the housing block 82. When the housing blocks are abutted together, cavities 92 and 96 form a passageway for the optical transmission line 52, and the hemicylindrical cavities 94 and 98 form a passageway for the transmission line 54. The housing blocks 80 and 82 may be fastened together in an abutting relationship by conventional fastening methods such as by screws, bolts or adhesives.

Each of the passageways includes a slight taper that is best illustrated by passageways 88 and 90. This slight taper produces a radial compression when the optical transmission line is inserted into the passageways. The taper allows the transmission lines to be easily inserted into the passageways, and the radial compression provides for proper alignment with the optical windows 60, 64, 68 and 72 and secures the transmission lines 52, 54, 56 and 58 within the passageways.

Connectors 100 and 102 extend from the ends of the passageways 84 and 86, and connectors 104 and 106 extend from the ends of the passageways formed by cavities 84 and 86 and cavities 88 and 90. The connectors 100, 102, 104 and 106 function to clamp and hold the optical transmission lines in a conventional manner. If desired, the connectors 100, 102, 104 and 106 may be implemented in a collect chuck type of construction that is common in the industry. All transmission line connectors, such as connectors 100, 102, 104 and 106 conform to established standards for compatibility with optical transmission lines.

The optical couplers illustrated in FIGS. 1, 2 and 3 and described in conjunction with these figures are intended to be illustrative of the present invention. It will be understood that these embodiments are not exhaustive. It is envisioned that other structure such as spherical glass or plastic bubbles having reflective coatings would also be suitable for use in the present invention. Although particular embodiments have been described in the foregoing Detailed Description, it will be understood that the invention is capable of numerous modifications, rearrangements and substitutions of parts without departing from the spirit of the invention.

Having thus described my invention, what I claim as new, and desire to secure by Letters Patent is:

1. A plural port optical coupler for coupling light from an input optical transmission line into output optical transmission lines in an optical communication system, comprising:
   a reflective curvilinear surface defining a bounded volume for reflecting light coupled into said volume, the interior of said volume being a light transmitting medium;
   a plurality of optical ports formed through the surfce and into said volume, one of said ports defining an input window and others of said ports defining output windows, each of said windows receiving one of the optical transmission lines;
   said port defining an input window including a lens in contact with the transmission line received within the window, said lens having a geometrical configuration to produce a predetermined light pattern within said volume; and
   said ports defining output windows each including a lens in contact with the transmission line received within the respective output window, said lens having a geometrical configuration to enhance the amount of light transferred through said output window into a transmission line.

2. The optical coupler of claim 1 wherein said means for coupling includes a housing having tapered passageways for receiving and radially compressing the optical transmission lines.

3. The optical coupler of claim 1 wherein said reflective curvilinear surface and said bounded volume comprise:
   a solid transparent spherical body; and a reflective coating on the exterior of said spherical body for reflecting light within said spherical body.

4. The optical coupler of claim 1 wherein said reflective curvilinear surface and said volume comprise:
a block of solid material having a spherical cavity formed therein; and
a reflective surface on the interior surface of said cavity for reflecting light within said cavity.

5. The optical coupler of claim 1 wherein said reflective curvilinear surface is spherical defining a spherical volume.

6. The optical coupler of claim 5 wherein each lens is formed by a cavity of a selected shape filled with index fluid of a selected index of refraction.

7. The optical coupler of claim 5 wherein said means for coupling comprises:
an input window formed in said reflective surface for introducing light into said spherical volume from an optical transmission line;
a primary output window formed in said reflective surface for receiving light into a primary output optical transmission line; and
at least one secondary output window formed in said reflective surface for receiving light into a secondary output optical transmission line, said secondary output window being formed in said reflective surface at a position for receiving a lesser amount of light than received by said primary output window.

8. A plural port optical coupler for optically connecting a light source optical transmission line with a plurality of optical output transmission lines comprising:
a solid transparent sphere;
a reflective coating deposited on the surface of said sphere for reflecting light impinging on said coating from the interior of said sphere;
an input window formed in said coating dimensioned to receive the end of the light source optical transmission line for introducing light into said sphere;
an input cavity formed in said sphere adjacent said input window and being configured to emit light into said sphere in a predetermined pattern;
a first output window formed in said coating on the opposite side of said sphere relative to said input window and being dimensioned to receive the end of a first output transmission line for introducing light from within the sphere into the first output transmission line;
a first output cavity formed in said sphere adjacent said first output window and being configured to maximize light transfer to the first output transmission line;
a second output window formed in said coating on said sphere and being dimensioned to receive the end of a second output transmission line for introducing light from within the sphere into the second transmission line; and
a second output cavity formed in said sphere adjacent said second output window and being configured to maximize light transfer to the second output transmission lines.

9. The optical coupler of claim 8 further comprising:
a third output window formed in said coating on the opposite side of the sphere from said second output window and being dimensioned for receiving a third output transmission line for introducing light from within the sphere into the second transmission line;
said second and third output windows being positioned equidistantly from said input window; and
a third output cavity formed in said sphere adjacent said third output window and being configured to maximize light transfer to the third output transmission line.

10. The optical coupler of claim 8 further comprising transparent index fluid having a selected index of refraction for filling said cavities to maximize light transfer through said cavities.

* * * * *